R. B. MAY.
Animal-Traps.
No. 136,330. Patented Feb. 25, 1873.
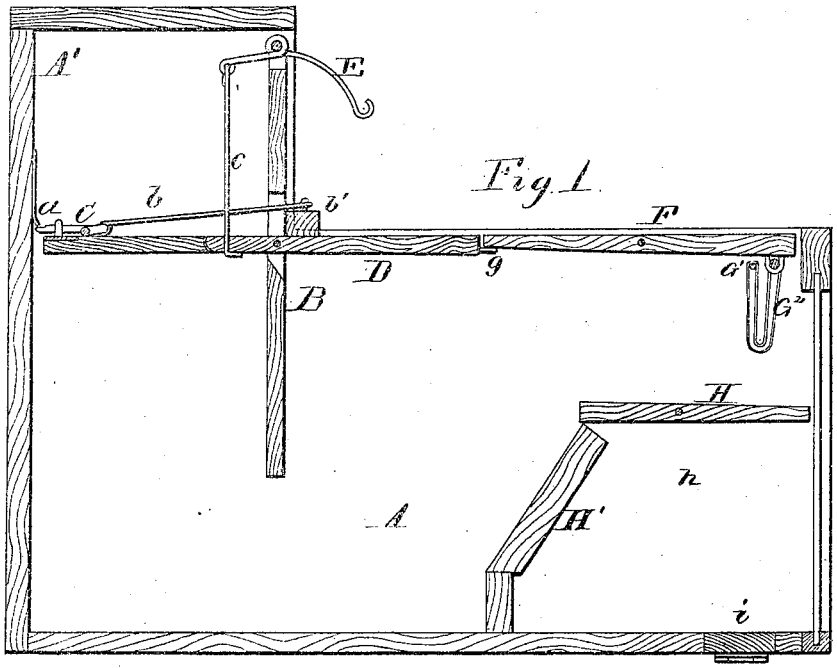
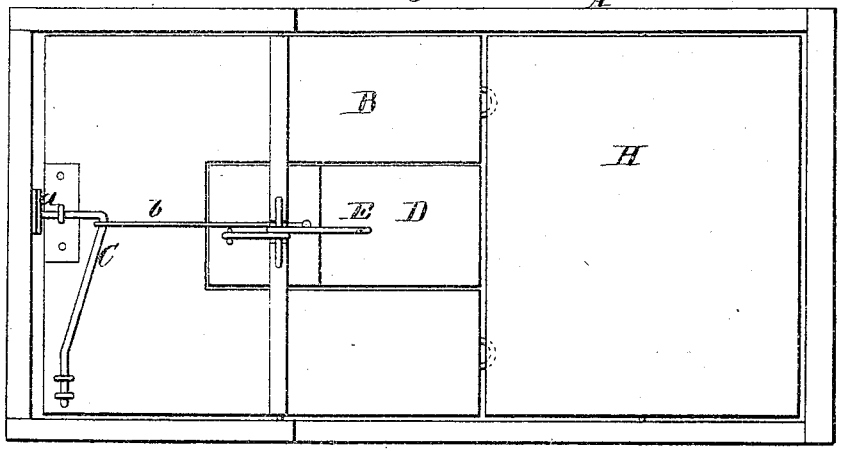
Witnesses:
E. A. Bates
T. A. Connolly
Inventor:
Robert B. May,
Chipman Hosmer & Co,
Attys.

UNITED STATES PATENT OFFICE.

ROBERT B. MAY, OF MURFREESBOROUGH, TENNESSEE.

IMPROVEMENT IN ANIMAL-TRAPS.

Specification forming part of Letters Patent No. 136,330, dated February 25, 1873.

*To all whom it may concern:*

Be it known that I, ROBERT B. MAY, of Murfreesborough, in the county of Rutherford and State of Tennessee, have invented a new and valuable Improvement in Animal-Traps; and I do hereby declare that the following is a full, clear, and exact description of the construction and operation of the same, reference being had to the annexed drawing making a part of this specification, and to the letters and figures of reference marked thereon.

Figure 1 of the drawing is a representation of a sectional view of my invention. Fig. 2 is a plan view of the same with a portion of the top cut away.

This invention has relation to animal-traps; and it consists in the construction and novel arrangement of a weighted pivoted platform constituting a part of the trap-roof, and at the same time acting as a tilting platform; also of an inner tilting weighted platform covering a supplementary inclosure, and in the general construction and arrangement of parts, substantially as and for the purpose hereinafter described.

Referring to the drawing, A designates an animal-trap having a portion of its top raised, as shown at A'. B designates a four-winged pivoted trap-door, closing the front of the raised compartment A' and a part of the roof of the trap. C is a sliding or pivoted spring-bolt, which engages with a catch, $a$, to hold the trap-door B in the position shown in Fig. 1. Attached to this bolt is a rod, $b$, which passes through an opening in the upper vertical wing of said trap-door, and is connected to a cleat, $b'$, resting on a pivoted board, D. When an animal of sufficient weight to depress the board D stands upon it, the bolt is withdrawn and the trap-door tilted, causing the animal to fall into the trap, after which the trap-door reassumes its proper position, the bolt engaging with the catch. The pivotal point of the board D is near the rear end of the latter, thus enabling the board to be more easily depressed. The bait-hook E is pivoted to the top of the trap-door B, and has its rear end connected by means of a rod, $c$, to the rear end of the board D, so that by pulling upon the bait-hook to obtain the bait the animal will thereby insure the tilting of said board when he is not heavy enough or does not rest his weight sufficiently on the forward part of the board. F designates a weighted pivoted platform constituting the remainder of the trap lid or roof. When the trap-door B is in the position shown, the platform F rests upon studs $g$ projecting from the former. When the bolt is drawn the platform F is tilted by the weight of the animal, but, being weighted at its rear end, regains its original position automatically. To prevent the platform F from turning over it is connected at its rear end to a rod, $G^1$, by means of a cord, $G^2$. H designates another tilting weighted platform, covering an inclosure, $h$, into which an animal falls when he climbs to said platform over the inclined wall H' when endeavoring to escape through the grated end of the trap. From the compartment $h$ the animal is taken through the doorway $i$.

What I claim as new, and desire to secure by Letters Patent, is—

1. The pivoted bait-hook E, connecting-rod $c$, pivoted board D, and sliding bolt C, combined and arranged substantially as specified.

2. The weighted pivoted platform F in combination with trap-door B, having the lugs $g$, the cord $G^2$, and rod $G^1$, substantially as specified.

3. The weighted tilting platform H, covering the compartment $h$ in a trap having the radial-winged trap-door B and tilting platform F, substantially as specified.

In testimony that I claim the above I have hereunto subscribed my name in the presence of two witnesses.

ROBERT B. MAY.

Witnesses:
  JAMES O. OSLIN,
  CHAS. R. HOLMES.